Patented Nov. 29, 1938

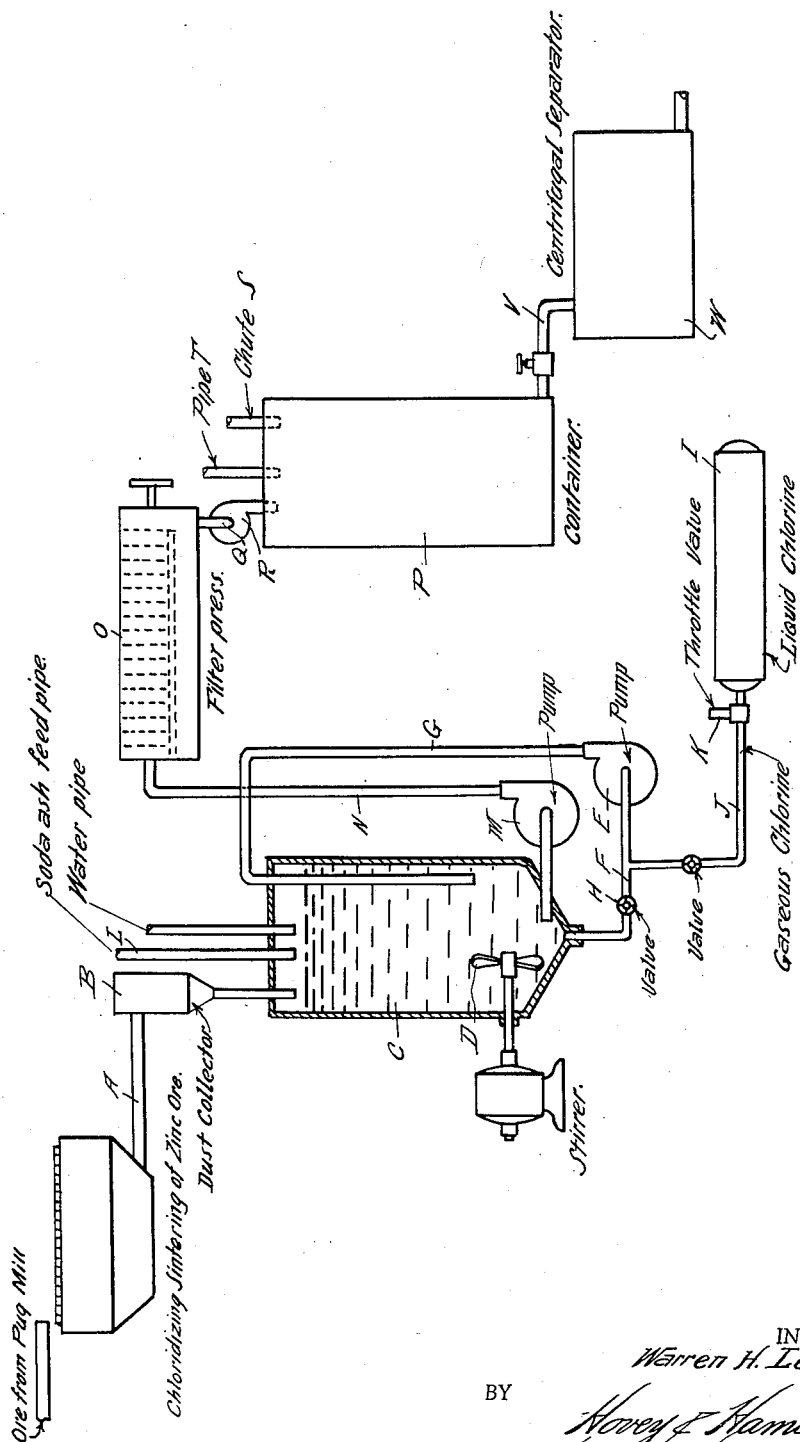

2,138,281

UNITED STATES PATENT OFFICE 2,138,281

PROCESS OF TREATING CADMIUM BEARING MATERIALS

Warren H. Leverett, Bartlesville, Okla., assignor to National Zinc Company, Inc., New York, N. Y., a corporation of New York Application July 29, 1937, Serial No. 156,356

9 Claims. (Cl. 75—112)

This invention relates to the process of treating cadmium bearing materials, and particularly those cadmium bearing products of a zinc ore sintering plant which contain cadmium and zinc sulphides.

In the recovery of cadmium from cadmium bearing zinc ore it has been found difficult to obtain a sufficient percentage of the cadmium without the use of the digesting pot, which is used for sulphating the insoluble cadmium. This hot operation is not only disagreeable, but is also very expensive and in many instances is prohibitive.

The present invention contemplates the method of treating cadmium bearing material, wherein at least a part of the cadmium is in the form of a sulphide, and it may also contain cadmium sulphate, cadmium oxide, cadmium sulphite, and other metals, to produce a relatively pure cadmium. While any cadmium containing material may be treated by this method, it is primarily intended for use with those cadmium bearing materials such as fumes and dust obtained from a zinc ore sintering plant.

In the sintering operation, the cadmium and other associated metals are carried away in the resulting gases as fumes and fine dust particles. These particles are collected by suitable known methods, such as filtration in a dust collector or by electrical precipitation.

Reference will now be had to the accompanying drawing, wherein the various steps of the method are shown diagrammatically with suitable legends to make clear the invention.

The gases carrying compounds of various metals from the sintering machine pass through conduit A to the dust collector B, where the small metal bearing particles are separated from the gases. A quantity of this dust of metal bearing particles is mixed with a sufficient quantity of water to form a resultant mix suitable for pumping. This mix is made in a container C, having a mixer D. A pump E is interconnected with the lower portion of container C by means of a conduit F, and the delivery pipe G from the pump enters container C and extends into the mix contained therein. Valve H controls the flow of mix from container C to the pump E. The liquid chlorine tank I is interconnected with conduit F between valve H and the pump by means of pipe J. A throttle valve K in pipe J and adjacent tank I is adjustable to vary the release of liquid chlorine, which, when released, expands to a gaseous form. The object of the conduit pipes, pump valves and chlorine tank is to provide a mix with a sufficient quantity of gaseous chlorine to react with all the oxidizable substances present in the solution.

The presence of the chlorine gas in the mix will change all the insoluble forms of cadmium into soluble forms, and will also eliminate all sulphur dioxide. If the sulphur dioxide is not removed, objectionable cadmium sulphide will be formed when metallic zinc is added to precipitate the cadmium.

During the chlorination process, a sufficient quantity of soda ash may be added through pipe L to the mix to maintain the acidity thereof at a low point.

Since all the forms of cadmium, including the sulphide, are soluble through the action of chlorine, it is apparent that all the cadmium will be in solution and may be separated from the insoluble solids by filtration. By means of pump M the chlorinated mix is removed from container C through pipe N to the filter press O where all of the insoluble solids, including the lead sulphate, are filtered out. A sufficient amount of water must always be present in the solution to dissolve all the cadmium salts or compounds formed.

The solution containing the cadmium is now removed from the filter press to container P through conduit Q by pump R. Metallic (dust) zinc is now added through chute S to the solution in sufficient quantities to precipitate all the cadmium, thereby producing metallic cadmium in the form of a sponge. The precipitation of cadmium with zinc dust tends to neutralize the solution, therefore sufficient sulphuric acid is added through pipe T to maintain the solution slightly acid. By means of gravity the zinc treated solution is flowed through pipe V to the centrifugal separator W where the cadmium is separated from the liquid and collected as a sponge.

This cadmium sponge may be further treated to produce a purer product by drying the sponge at about 125° C. in the absence of free oxygen. This may be accomplished in the atmosphere of gas containing no free oxygen. After thoroughly drying the sponge, the temperature is then raised to a degree just sufficient to volatilize the cadmium. The cadmium vapors are then recovered in the usual condensers, and the resultant cadmium is cast to form the commercial sticks. By redistillation a yet purer cadmium product may be obtained.

By the use of the present method, it is apparent that the cadmium bearing material will yield substantially all its cadmium due to the fact that a sufficient amount of water and chlorine will completely dissolve all the cadmium, regardless of its original composition. The sintering of zinc ore containing cadmium, usually as a sulphide, results in the formation of cadmium oxide, cadmium sulphate, cadmium sulphite and cadmium sulphide. At ordinary temperatures the $CdSO_4$ is dissolved by water, CdO is dissolved by acid or chlorine, the sulphite is dissolved by $H_2SO_4HCl$ and chlorine, while the cadmium sulphide is dissolved only by the chlorine. It is therefore apparent that the cadmium in all its usual forms is soluble in a solution containing a sufficient quantity of water and chlorine. Cadmium so dissolved may be readily precipitated by the addition of metallic zinc to produce a commercial cadmium sponge. As stated above, this cadmium sponge may be purified by distillation or by any other known method.

While I have quite specifically set forth the different steps of this method and have definitely included cadmium bearing materials, such as ore obtained from the fumes and dust produced by sintering zinc ore, yet it is desired to be limited only by the scope of the appended claims.

What I claim is:

1. The process of treating cadmium bearing materials comprising introducing chlorine into said cadmium bearing material, in the presence of water, to cause the undissolved cadmium compounds to go into solution; separating the insoluble matter from said solution; adding metallic zinc to said solution to precipitate said cadmium; and removing the liquid from said precipitate.

2. The process of treating cadmium bearing products from a zinc ore sintering plant comprising intermixing chlorine with said cadmium bearing products in the presence of water to dissolve the water insoluble cadmium and zinc compounds; removing the insoluble matter from the liquid; adding metallic zinc to said liquid to precipitate the cadmium; then removing the liquid from said precipitate.

3. The process of treating cadmium bearing fumes and dust from a sintering plant comprising introducing chlorine gas into said fumes and dust, in the presence of water, to dissolve the then undissolved cadmium compounds; separating the insoluble material from said solution; and adding metallic zinc to said solution to cause a precipitation of the cadmium therein.

4. The process of treating cadmium bearing materials from an ore sintering plant comprising admixing chlorine with said material, in the presence of water in sufficient quantity to dissolve all the cadmium compounds present; removing the insoluble material from said solution; adding metallic zinc to said solution to precipitate the cadmium; and removing the cadmium precipitate.

5. The process of treating cadmium bearing materials from an ore sintering plant comprising admixing chlorine with said material, in the presence of water in sufficient quantity to dissolve all the cadmium compounds present; removing the insoluble material from said solution; adding metallic zinc to said solution to precipitate the cadmium; removing the cadmium precipitate; subjecting said cadmium precipitate to a heat just sufficiently high to distill the cadmium; and recovering the vaporized cadmium in any convenient manner.

6. The process of treating cadmium bearing materials from an ore sintering plant comprising admixing chlorine with said material, in the presence of water in sufficient quantity to dissolve all the cadmium compounds present; removing the insoluble material from said solution; adding metallic zinc to said solution to precipitate the cadmium; removing the cadmium precipitate; subjecting said cadmium precipitate to a temperature of approximately 125° C. to drive off all the water; subjecting said dried cadmium precipitate to a temperature sufficient to distill the cadmium; and recovering the vaporized cadmium by any of the known means.

7. The process of treating cadmium bearing materials from an ore sintering plant comprising admixing chlorine with said material, in the presence of water in sufficient quantity to dissolve all the cadmium compounds present; removing the insoluble material from said solution; adding metallic zinc to said solution to precipitate the cadmium; removing the cadmium precipitate; subjecting said cadmium precipitate to a temperature of approximately 125° C. to drive off all the water; subjecting said dried cadmium precipitate to a temperature sufficient to distill the cadmium; condensing said vaporized cadmium; and redistilling said condensed cadmium and again recovering the vaporized purified cadmium by a suitable means.

8. The process of treating cadmium bearing materials from an ore chloridizing sintering plant comprising admixing chlorine with said material, in the presence of water in sufficient quantity to dissolve all the cadmium compounds present; removing the insoluble material from said solution; adding metallic zinc to said solution to precipitate the cadmium; removing the cadmium precipitate; subjecting said cadmium precipitate to a heat just sufficiently high to distill the cadmium; and recovering the vaporized cadmium in any convenient manner.

9. The process of treating cadmium bearing materials comprising introducing chlorine into said cadmium bearing material, in the presence of water, to cause the undissolved cadmium compounds to go into solution; separating the insoluble matter from said solution; adding metallic zinc to said solution to precipitate said cadmium.

WARREN H. LEVERETT.